INVENTOR.
JAMES G. WEIT
BY
Meyer, Tilberry & Body
ATTORNEYS

United States Patent Office

3,434,010
Patented Mar. 18, 1969

3,434,010
OVER CURRENT PROTECTOR DEVICE FOR
INDUCTION HEATING INSTALLATION
James G. Weit, Cleveland, Ohio, assignor to The Ohio
Crankshaft Company, Cleveland, Ohio, a corporation
of Ohio
Filed Oct. 18, 1966, Ser. No. 587,470
U.S. Cl. 317—13                                              6 Claims
Int. Cl. H02h 7/06; H05b 1/02; H01h 47/24

ABSTRACT OF THE DISCLOSURE

A device for de-energizing an induction heating power supply when an output parameter exceeds a given value. A photosensitive means de-energizes the supply when illuminated by a light source which light source is controlled by a capacitor charged by a voltage proportional to the monitored parameter.

---

Figure 1:
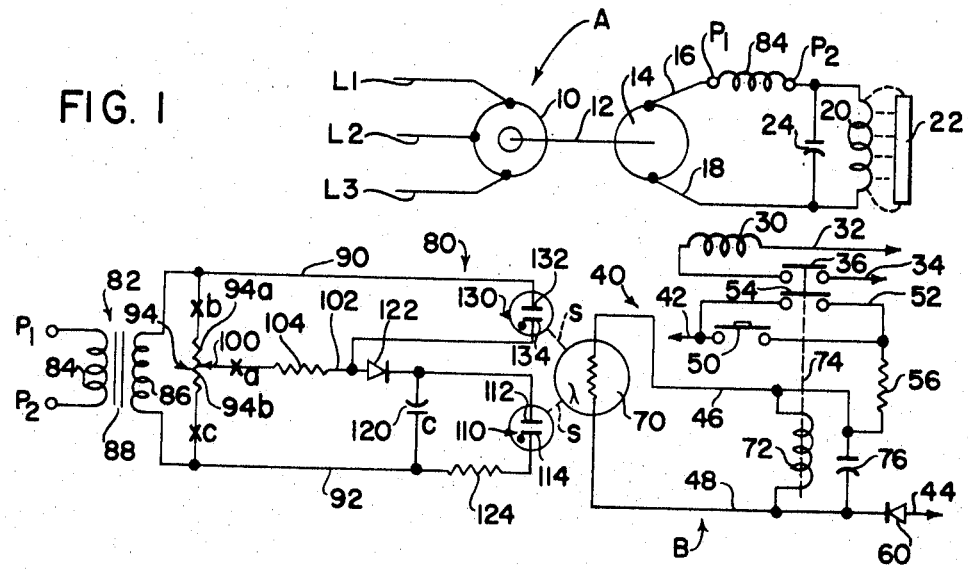

This invention pertains to the art of induction heating and more particularly to an overcurrent protector device for an induction heating installation.

The invention is particularly applicable for protecting an induction heating installation from destructive, or harmful, over currents and it will be described with particular reference thereto; however, it will be appreciated that the invention has much broader applications and may be used as a protector device which is sensitive to other electrical parameters in various installations.

The term "over current" as used in the induction heating field refers to a current greater than the rated current of a power supply, such as a generator. This generally accepted definition of "over current" is utilized herein.

An induction heating installation often includes a rotary generator having output leads connected across a heating station. The general construction of the generator determines the maximum current which the generator should supply to the heating station. By changing various parameters of the heating station or its electrical components, a current greater than the maximum rated current of the generator may pass through the output leads. If this over current is between 100%–115% of the maximum rated current, the generator generally will not be harmed, even during prolonged duty cycles at this somewhat low over current level. If the over current exceeds 115% of the maximum rated current, prolonged operation at this over current level can harm various components of the generator. In particular, this level of over current may increase the temperature of the windings within the generator to a value that will destroy the insulation of the windings. When this happens, the generator must be disassembled and new windings must be installed. This is a costly procedure and causes substantial down time of the heating installation.

To assure that the output current of a generator does not exceed certain over current values, it has been proposed that the generator be provided with an over current protector device which de-energizes the generator when the over current in the output circuit exceeds a preselected level. Although such proposed devices protect the generator from destructive over currents, heretofore, they all possessed certain disadvantages. For instance, it has been found that these prior over current protector devices have been relatively large and quite expensive. In addition, the over current at which the protector device will de-energize the generator has been somewhat dependent upon temperature and inherent variations within the device itself. The majority of these prior protector devices were designed to de-energize the generator when a certain over current was exhibited, such as a current exceeding 115% of the rated current. Consequently, the generator was de-energized when the output current momentarily exceeded a pre-set value. This completely disregards the fact that most heating installations can withstand certain over currents for a time dependent upon the actual level of over current. For instance, an over current of approximately 115% of the rated current can be tolerated for at least ten seconds without damage to the generator. As the over current increases, the time during which the over current will not harmfully affect the generator decreases. For instance, when the over current exceeds approximately 130%, the generator should be allowed to function only for a few seconds, such as three seconds. When the over current exceeds approximately 140%, the generator should be shut down immediately. Heretofore, the over current protector devices for generators could not effectively vary the time before shutting down the generator in accordance with the amount of over current appearing in the output circuit or load circuit of the generator. In summary, the prior over current protector devices have been responsive to a preselected over current whereas the response should be based on both the amount of over current and the time during which this over current appears. When a fixed over current device is used, the device must be set to a relatively low level; therefore, these prior over current protector devices were actuated even though the over current would be experienced for a time which would not damage the generator.

These and other disadvantages of the prior over current protector devices are completely overcome by the present invention which is directed toward an over current protector device for a generator, or a similar machine, which device allows the generator to function for a short time at certain over current levels before the generator is shut down. The time delay before the generator is shut down is determined by the level of the over current.

In accordance with the present invention, there is provided a device for de-energizing an induction heating power supply exceeds a given value. This device comprises a photo-sensitive means for deenergizing the power supply upon the receipt of a light signal; a light source capable of creating the necessary light signal when illuminated, this light source having two terminals and being illuminated when a given voltage level is applied across these terminals; a capacitor connected across the terminals and in parallel with the light source; and a charging circuit for charging the capacitor. In accordance with the invention, the charging circuit comprises an input, two output leads connected across the capacitor, a resistor in one of the leads, and means for applying across the input of the charging circuit a voltage proportional to the parameter being monitored. In this manner, a voltage proportional to the parameter is applied through the resistor and across the capacitor.

By providing a control device as described above, the parameter being monitored, such as current within the power supply, is converted into a voltage which is applied across a capacitor. The capacitor is connected in parallel across a light source having a preselected starting voltage. As the voltage build up across the capacitor reaches the starting voltage of the light source, the light source is illuminated, and the photo-sensitive means is actuated to de-energize the power source. If the over current is relatively low, the capacitor is charged slowly to the starting voltage of the light source. On the other hand, if the over current is relatively high, the capacitor is charged rapidly to the starting voltage of the light source. In this manner, the light source is illuminated within a time determined by the charging circuit parameters and the amount of over current being monitored.

The primary object of the present invention is the provision of a device for de-energizing an induction heating power supply when an electrical parameter of the power supply exceeds a given level which device is lightweight and relatively small, is durable in use, is relatively insensitive to temperature changes, and is relatively inexpensive to produce.

Another object of the present invention is the provision of a device for de-energizing an induction heating power supply when an electrical parameter of the power supply exceeds a given level, which device de-energizes the power supply within a predetermined time dependent upon the level of increase of the parameter in the power supply.

Another object of the present invention is the provision of a device for de-energizing an induction heating power supply when an electrical parameter of the power supply exceeds a given level, which device uses, as essential components, a photo-responsive switching circuit and a light source that is illuminated in response to a selected value of a parameter being monitored within the power supply.

Figure 2:
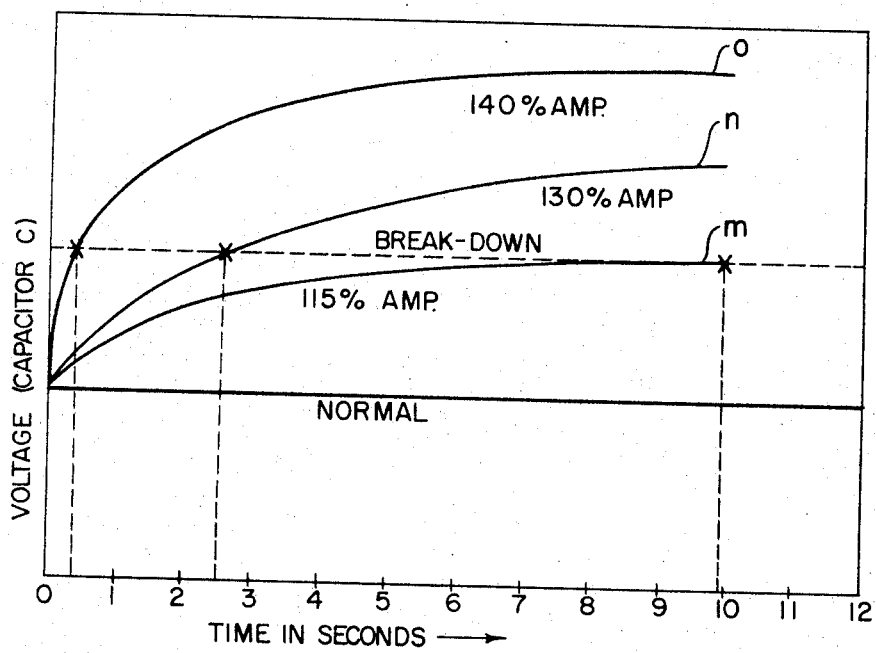

These and other objects and advantages will become apparent from the following description used to illustrate the preferred embodiment of the invention as read in connection with the accompanying drawing in which:

FIGURE 1 is a wiring diagram illustrating, somewhat schematically, the preferred embodiment of the present invention; and FIGURE 2 is a graph illustrating certain operating characteristics of the embodiment of the invention shown in FIGURE 1.

Referring now to the drawing wherein the showings are for the purpose of illustrating a preferred embodiment of the invention only, and not for the purpose of limiting same, FIGURE 1 shows an induction heating installation A which may take a variety of structural forms, and an over current protector device B. The over current protector device, of course, can be used to control various other electrical parameters, such as over voltage. In accordance with the illustrated embodiment of the invention, the installation A includes a three phase motor 10 having input lines L1, L2, and L3 and an output shaft 12 connected onto a rotary generator 14. The generator includes output leads 16, 18 connected across an induction heating coil 20. A workpiece 22 is inductively coupled with the heating coil 20 to allow heating of the workpiece by known induction heating principles. As is common practice, a power factor correcting capacitor 24 is connected across leads 16, 18 so that the power factor of the heating circuit or output load of the generator is adjusted to substantially unity. A field winding 30 having power rleads 32, 34, is adapted to energize the generator 14. When current flows through the field winding, the generator is energized, and when no current flows through the field winding, the generator is de-energized. A normally open switch 36 controls the field winding, and in turn controls the output of the generator, in known fashion.

The operation of switch 36 is controlled by the over current protector device B so that the switch is opened and the generator is de-energized when protector device B is actuated, in a manner to be described later. The device B includes a photo-responsive switching circuit 40 having input leads 42, 44. These input leads define control lines 46, 48. Within the control line 46, there is provided a push button switch 50 and a holding circuit 52 in parallel with the push button switch. The holding circuit includes a holding switch 54 operably connected with switch 36. Line 46 also includes a current limiting resistor 56. Referring now to the control line 48, this line includes a half-wave rectifier 60, illustrated as a diode. In parallel across lines 46, 48 there is provided a photo-sensitive device 70 having a dark resistivity and a light resistivity. When device 70 is in the dark, the resistivity of the device is quite high, such as 200K ohms; however, when the device 70 receives a light signal $s$, the resistivity of the device abruptly switches to a low level, such as 5K ohms. A variety of photo-sensitive devices have this particular characteristic, however, other similar switching characteristics can be used in accordance with the present invention. In parallel aross control lines 46, 48 is a relay coil 72 adapted to operate a mechanical coupling 74 connected onto switches 36, 54 and a capacitor 76 to prevent chatter of the controlled switches. The photo-responsive circuit 40 operates to hold the switch 36 closed.

Assuming that the photo-sensitve device 70 is in the dark and exhibits a high resistivity, the push button switch 50 may be manually closed to actuate the generator. Closing switch 50 causes a current flow through coil 72. This closes switches 36, 54. In this manner, the generator 14 is energized. As switch 50 is released, the switch 54 maintains current flow through the coil 72, and the current flow through this coil is high enough to maintain switches 36, 54 closed. The current flow through the device 70, which is in the dark and has a high resistivity, is relatively low. When a light signal $s$ is received by device 70, the resistivity of the device drops drastically. This causes a high current flow through the device 70, which in turn reduces the current flow through coil 72. The coil 72 releases the mechanical coupling 74 so that the normally open switches 36, 54 are opened. This de-energizes the generator 14.

The over current protector device B includes a control circuit 80 for creating the light signal $s$ when a certain amount of over current is exhibited within the heating installation. Of course, this control circuit 80 may be operative upon increases in voltage or other parameters. The control circuit 80 includes control points P1, P2 across which the parameter being monitored is exhibited. In the illustrated embodiment, the points P1, P2 are in output lead 16. When a current is being monitored, a current transformer 82 having a primary 84, a secondary 86, and a core 88 is connected across the points P1, P2. The secondary winding 86 is connected onto output leads 90, 92 which are in turn connected across voltage divider 94. A pointer or pick-up 100 separates the voltage divider 94 into upper and lower portions 94a, 94b, respectively. The pointer 100 is electrically connected onto a line 102 including a charging resistor 104. The charging resistor 104 combines with other components in the circuit between lines 92, 102 to provide a charging circuit. These other components include a neon light 110 capable of creating a signal $s$ when a preselected starting voltage is applied across the terminals 112, 114. The main charging element of the charging circuit is a capacitor C, designated 120. This charging capacitor is in series with a half-wave rectifier 122, in the form of a diode. The discharge resistor 124 is connected in series with the neon light 110 to hold the light "on" momentarily after it has been illuminated. Resistor 124 controls the discharge rate of capacitor 120 after light 110 is illuminated.

In operation, the circuit 80 monitors an electrical parameter, such as current, between points P1, P2. During normal operation, the parameter between these points produces a voltage of known level across the divider 94. In practice, this voltage is approximately 100 volts. The voltage across portion 94b is applied across lines 92, 102. This charges capacitor 120 to a selected voltage below the starting voltage of the neon light 110. As the electrical parameter across points P1, P2 increases, the voltage across portion 94b increases proportionally. This tends to charge the capacitor 120 to a new voltage level through the resistor 104. If the new voltage across portion 94b is less than a selected value, such as 115% of the desired parameter value, the increased charge on capacitor 120 does not create a voltage across the light 110 which is sufficient to illuminate the light. Assuming that the increased voltage across the lines 92, 102 is above 115% of the desired parameter value, the capacitor 120 eventually charges to a voltage exceeding the illumination starting voltage of light 110. This illuminates the light and causes the signals. In this manner, the photo-sensitive device 70 is actuated to open switch 36, as explained later. If the over value of the parameter being monitored is substantial, capacitor 120 is charged to the illuminating or starting voltage of light 110 quite rapidly. If the over value is relatively small, the charging time is correspondingly increased. If the over value or over current across points P1, P2 is reduced before the capacitor is charged sufficiently to illuminate light 110, the light is not illuminated. This allows momentary over values without de-energizing the generator 14.

Referring now to FIGURE 2, the operation of circuit 80 is graphically illustrated. Curve m illustrates an over value of the monitored parameter which is approximately 115%. The components are selected so that the light will illuminate at approximately ten seconds. This is illustrated at point x on curve m. Curve n represents an over value of 130% of the normal operating value of the parameter being monitored. The capacitor 120 is charged more rapidly so that the light 110 is illuminated after approximately 2.5 seconds. Curve o represents an over value of approximately 140% which causes the capacitor to charge rapidly so that the light is illuminated substantially at once. FIGURE 2 illustrates that the increase in the monitored parameter, which is illustrated as amperes, causes a more rapid illumination of light 110. Correspondingly, a lesser value of over current causes an increase in the capacitor charging time and increases the time before the generator is de-energized. If the over current is reduced before the light illuminates, the capacitor does not charge to the light illuminating value. Consequently the generator is not de-energized.

Referring again to FIGURE 1, a fail safe branch is utilized in circuit 80. This branch is in parallel with the upper portion 94a of the voltage divider 94, and it includes a second neon light 130 capable of creating a light signal s when a preselected voltage is applied across terminals 132, 134. The fail safe branch operates substantially as follows. If the line 102 is open at point a, light 130 is connected across the complete voltage divider 94 and in series with the light 110. There is a certain amount of leakage through capacitor 120; therefore, a high voltage is applied across light 130 and it is illuminated. This immediately drops the voltage across this light and creates a high voltage across the capacitor 120. Light 110 is illuminated. The same thing occurs when the voltage divider 94 is broken at end b. If end c is broken, the voltage across the divider is applied to capacitor 120, and light 110 is illuminated. If the capacitor becomes shorted, a high voltage is immediately applied across the light 130, and it is illuminated. If the diode 122 becomes shorted, there is an A.C. path through the capacitor 120 so that a low voltage appears across this capacitor. This immediately applies a high voltage across light 130, and the light is illuminated. Both lights 110, 130 are appropriately positioned with respect to photosensitive device 70 so that the signal s from either light is sufficient to switch the circuit 40. The use of the auxiliary light 130 provides a substantial fail safe characteristic for the circuit 80, as explained above.

In practice, the preferred embodiment of the invention as illustrated in FIGURE 1 includes the following values for the various components:

| | |
|---|---|
| Resistor 56 | 10K ohms—1 watt. |
| Photo-sensitive device 70 | Sylvania 8100, RCA 4403 or Clairex CL 504. |
| Coil 72 | 2500 ohms—RS5D relay. |
| Capacitor 76 | 3 mf.—50 volts. |
| Transformer 82 | 2.84 amp to 10 ma. |
| Voltage divider 94 | 10K ohms (pot). |
| Resistor 104 | 39K ohms—½ watt. |
| Capacitor 120(C) | 2 mf.—150 volts. |
| Resistor 124 | 47 K ohms—½ watt 10%. |
| Lights 110–130 | 3AG-A. |
| Diodes 60–120 | 500 ma.—600 volts. |

Having thus described my invention, I claim:

1. A device for de-energizing an induction heating power supply when an output parameter exceeds a given value, said device comprising a photosensitive means for de-energizing said power supply upon the receipt of a light signal; a light source capable of creating said light signal when illuminated, said light source having two terminals and being illuminated when a given voltage level is applied across said terminals; a capacitor connected across said terminals and in parallel with said light source; and a charging circuit for charging said capacitor, said charging circuit comprising an input, two output leads connected across said capacitor, a resistor in one of said leads, and means for applying a voltage proportional to said parameter to said input whereby a voltage proportional to said parameter is applied through said resistor across said capacitor.

2. A device as defined in claim 1 including a second light source capable of creating said light signal when illuminated, said second light source having two terminals and being illuminated when a second given voltage level is applied across said terminals; and circuit means for applying a voltage level at least equal to said second given voltage level upon failure of said charging circuit.

3. A device as defined in claim 1 including a second light source capable of creating said light signal when illuminated, said second light source having two terminals and being illuminated when a second given voltage level is applied across said terminals; and said charging circuit having a third output lead with an output voltage normally below said second given voltage level and corresponding to said voltage across said two output leads, said output voltage being applied across said third lead and one of said two leads, said third lead and said one of said two leads being connected onto the terminals of said second light source.

4. An electrical switching system comprising: a first circuit including a switching device having a first and second condition and a photosensitive element with a first resistance when said element is essentially in the dark and a second resistance when said element is exposed to a light source; said switching device being in said first condition when said element exhibits said first resistance and in said second condition when said element exhibits said second resistance; a second circuit including a light source adjacent said photosensitive device, said light source being illuminated when a selected voltage is applied thereacross, a capacitor in parallel with said light source, a voltage source with input leads and connected across said capacitor by output leads, a resistor in at least one of said output leads, and a rectifier in at least one of said output leads to apply only direct current across said capacitor; and, a third circuit for applying a voltage across said input leads in accordance with a variable electrical parameter whereby said capacitor is charged in accordance with said parameter value and said light is illuminated when said capacitor is charged to said selected voltage.

5. An electrical switching system as defined in claim 4 including a resistance in said second circuit between said light source and said capacitor.

6. An electrical switching system as defined in claim 4 including a second light source adjacent said photosensitive device, said second light source being illuminated when a selected voltage is applied thereacross, said voltage source having a second output circuit defined by two output leads, said second light source being connected across said output leads of said second output circuit and means for adjusting the voltage of said output circuit to normally be below the selected illumination voltage of said second light source.

References Cited

UNITED STATES PATENTS 2,647,983    8/1953    Boyd            219—10.77
3,307,076    2/1967    Park             317—124 X JOHN F. COUCH, *Primary Examiner.*

J. D. TRAMMELL, *Assistant Examiner.*

U.S. Cl. X.R.

219—10.77, 519; 250—206; 317—31, 36, 124